United States Patent
Sonobe

(10) Patent No.: US 7,948,780 B2
(45) Date of Patent: May 24, 2011

(54) SEMICONDUCTOR DEVICE FOR SWITCHING POWER SUPPLY CONTROL, STARTUP CIRCUIT, AND STARTUP METHOD FOR SWITCHING POWER SUPPLY DEVICE

(75) Inventor: Koji Sonobe, Matsumoto (JP)

(73) Assignee: Fuji Electric Systems Co., Ltd. (JP)

( * ) Notice: Subject to any disclaimer, the term of this patent is extended or adjusted under 35 U.S.C. 154(b) by 250 days.

(21) Appl. No.: 12/407,587

(22) Filed: Mar. 19, 2009

(65) Prior Publication Data

US 2009/0237965 A1    Sep. 24, 2009

(30) Foreign Application Priority Data

Mar. 19, 2008 (JP) .................................. 2008-071098

(51) Int. Cl.
*H02M 1/00* (2007.01)
*H02M 3/335* (2006.01)
(52) U.S. Cl. ..................... 363/49; 363/21.08; 363/21.16
(58) Field of Classification Search ............... 363/21.04, 363/21.07–21.11, 21.12, 21.15–21.18, 49
See application file for complete search history.

(56) References Cited

U.S. PATENT DOCUMENTS

| | | | |
|---|---|---|---|
| 6,906,934 B2 * | 6/2005 | Yang et al. ....................... | 363/49 |
| 6,940,320 B2 | 9/2005 | Sukup et al. | |
| 7,099,163 B1 * | 8/2006 | Ying ........................... | 363/21.11 |
| 7,486,529 B2 * | 2/2009 | Sukup ............................... | 363/49 |
| 2005/0077551 A1 | 4/2005 | Halamik et al. | |
| 2006/0044845 A1 * | 3/2006 | Fahlenkamp et al. ....... | 363/21.15 |
| 2008/0117653 A1 * | 5/2008 | Saito ................................ | 363/20 |

FOREIGN PATENT DOCUMENTS

| | | | |
|---|---|---|---|
| JP | 2006-204082 A | | 8/2006 |
| JP | 2006204082 A | * | 8/2006 |
| JP | 2007-508800 A | | 4/2007 |
| JP | 2007-509493 A | | 4/2007 |
| WO | 2005038548 A2 | | 4/2005 |

* cited by examiner

*Primary Examiner* — Gary L Laxton
*Assistant Examiner* — Jeffrey Gblende
(74) *Attorney, Agent, or Firm* — Rossi, Kimms & McDowell LLP

(57) ABSTRACT

A semiconductor device for switching power supply control limits the startup current supplied from a high-voltage input terminal, and prevents heat generation and combustion in case of an anomaly. A high-voltage input terminal is connected to the main winding of a transformer, and is supplied with a startup voltage upon input of a power supply to the switching power supply device. A power supply terminal is connected to a capacitor, and outputs a startup current to charge the capacitor after input of the power supply input. A startup circuit is connected between the high-voltage input terminal and the power supply terminal, and charges the capacitor while increasing the startup current with magnitude proportional to the voltage value of the power supply terminal, and after startup, turns off the startup current and supplies the power supply voltage only from the auxiliary winding of the transformer.

10 Claims, 13 Drawing Sheets

SEMICONDUCTOR DEVICE FOR SWITCHING POWER SUPPLY CONTROL, STARTUP CIRCUIT, AND STARTUP METHOD FOR SWITCHING POWER SUPPLY DEVICE

BACKGROUND

The present invention relates to a semiconductor device for switching power supply control, a startup circuit, and a startup method for a switching power supply device, and in particular relates to a semiconductor device for switching power supply control, a startup circuit, and a startup method for a switching power supply device, to supply power to a load connected to the secondary-side winding of a transformer.

In flyback-type switching power supply devices of the prior art, integrated circuit devices (hereafter "ICs") for switching power supply control have been used which induce a voltage in the secondary side of a transformer by turning a switching element connected to the primary-side winding on and off. This IC for switching power supply control normally incorporates a startup circuit within a single-chip integrated circuit comprising a circuit configuration having numerous transistors and other components, and also employs a voltage-stabilizing capacitor, connected externally to an IC power supply terminal, to stabilize the power supply voltage which drives the IC for switching power supply control itself.

In a switching power supply device of this type, after input of the power supply on the transformer primary side, until the output voltage of the switching power supply device stabilizes, a startup current has been supplied to the capacitor from this startup circuit to charge the capacitor, and by supplying a feed voltage from the fully-charged capacitor to the IC power supply terminal to operate the IC, switching operation has been started. That is, the feed voltage of the IC for switching power supply control is, for example, easily obtained as an auxiliary output voltage after the completion of startup of the switching power supply device, but at least during startup a power supply must be supplied separately from the input voltage, and for this reason a startup circuit to start the IC has been necessary.

FIG. 9 is a block diagram showing an example of a switching power supply device. The switching power supply device has a bridge diode BD101, capacitors C101 to C103, diodes D101 and D102, a transformer T101, a power transistor PwT11, a resistor R101, a photocoupler PC101, a switching power supply control IC 100, and a voltage detection circuit 111. The switching power supply control IC 100 has a high-voltage input terminal VH, power supply terminal VCC, output terminal OUT, current detection terminal IS, ground terminal GND, feedback terminal FB, and other terminals, and also has a startup circuit 101 and pulse control portion 102 and similar. The switching power supply device shown in FIG. 9 is an example of a so-called insulated AC-DC converter in which a commercial 100 V AC power supply is rectified, and after passing through the transformer T101, prescribed power is supplied to the load 121.

The bridge diode BD101 rectifies the commercial 100 V AC power supply. The rectified DC voltage is applied to a series circuit in which the main winding N101 on the primary side of the transformer T101 and the power transistor PwT101, which is a switching element, are series-connected. The power transistor PwT101 is grounded via a resistor R101 for current detection, used to detect the current flowing therein.

The feedback terminal FB of the switching power supply control IC 100 is connected to the phototransistor PT101 of the photocoupler PC101. The current detection terminal IS is connected to the connection point of the power transistor PwT11 and the current detection resistor R101, and receives as input the voltage value detected by the resistor R101. The ground terminal GND is grounded. The output terminal OUT is connected to the gate of the power transistor PwT11. The power supply terminal VCC is connected to the auxiliary winding (hereafter called the coil) on the primary side of the transformer T101 via the diode D101.

In this way, the switching power supply control IC 100 operates by means of a voltage induced in the coil N103 after completion of startup of the switching power supply device. Here, a capacitor C102 to stabilize the voltage supplied from the coil N103 is externally connected to the power supply terminal VCC of the IC 100.

When starting up after input of the power supply, in the switching power supply control IC 100, a startup current is supplied to the capacitor C102 from the bridge diode BD101 via the startup circuit 101. Then, the capacitor C102 is charged by the startup current, and when the voltage at the power supply terminal VCC rises to a prescribed value higher than the voltage necessary for operation of the IC 100, the startup current from the startup circuit 101 stops.

The pulse control portion 102 of the IC 100 comprises an internal oscillation circuit. In the pulse control portion 102, a pulse-modulated pulse signal is output from the output terminal OUT corresponding to the output voltage level received by the feedback terminal FB (including information related to the load level) and to the voltage input to the current detection terminal IS, at a switching frequency determined by the oscillation frequency of the oscillation circuit, to execute on/off control of the power transistor PwT101.

The load 121 is connected, via a rectifying/smoothing circuit comprising the diode D102 and capacitor C103, to the main winding N102 on the secondary side of the transformer T101. Because a voltage detection circuit 111 is connected between the rectifying/smoothing circuit and the load 121, the voltage supplied to the load 121 can be detected. The voltage signal detected by the voltage detection circuit 111 is fed back to the feedback terminal FB of the IC 100 via the photodiode PD101 of the photocoupler PC101 and the phototransistor PT101. Because the voltage signal is transmitted via the photocoupler PC101 to the primary side as a feedback signal, the primary side and secondary side of the transformer T101 are electrically insulated.

FIG. 10 is a block diagram showing the configuration of a startup circuit of the prior art. The startup circuit 101 comprises a startup device 112, current amplification circuit 113, and switch circuit 114, and has a startup voltage input terminal 101a, startup current output terminal 101b, and control terminal 101c. Within the startup circuit 101, the startup voltage input terminal 101a is connected to the high-voltage input terminal VH of the IC 100, and the startup current output terminal 101b is connected to the power supply terminal VCC of the IC 100. The control terminal 101c is connected to the power supply voltage detection circuit 103.

A capacitor C102 is connected externally, via the power supply terminal VCC of the IC 100, to the startup current output terminal 101b of the startup circuit 101. The high voltage supplied to the primary side of the transformer T101 is input via the high-voltage input terminal VH. The startup device 112 is a high-breakdown voltage element, to which most of the high potential difference between the high-voltage input terminal VH and the power supply terminal VCC is applied, and has the function of protecting other elements from high voltages. The current amplification circuit 113 uses a current mirror which amplifies a constant current such that the startup current is constant, and outputs the startup current from the startup current output terminal 101b via the switch circuit 114 to charge the capacitor C102. The power supply voltage detection circuit 103 detects the voltage at the power supply terminal VCC, and outputs an on/off signal, which is a control signal of the startup circuit 101, to the switch circuit 114.

Here, an "on" signal is output to the switch circuit 114 to pass a startup current until the power supply voltage reaches the voltage necessary to operate the IC 100, and when the voltage reaches a prescribed value higher than the voltage enabling operation of the IC 100, an "off" signal is output to halt the startup current. When startup of the switching power supply device is completed in this way, switching operation of the switching power supply device starts, and a power supply voltage (Vcc) is input at a prescribed magnitude from the coil N103 of the transformer T101 to the startup current output terminal 101b of the startup circuit 101, via the power supply terminal VCC. The above-described prescribed value normally has two values, high and low, so as to impart hysteresis; when the power supply voltage (Vcc) is lower than the lower of the prescribed values, the startup circuit again begins operation.

FIG. 11 is a circuit diagram showing an example of the specific configuration of a startup circuit of the prior art. In the startup circuit 101, the startup device 112 comprises N-channel high-voltage junction field effect transistors J11 and J12 (hereafter simply called transistors J11 and J12). The gates of these transistors J11 and J12 are connected to ground.

The current amplification circuit 113 shown in FIG. 10 comprises mutually current mirror-connected P-channel MOS transistors MP11, MP12 (hereafter called transistors MP11 and MP12) and a resistor R11. The switch circuit 114 comprises N-channel MOS transistors MN11, MN12 (hereafter called transistors MN11 and MN12) and resistors R12, R13.

The drains of the transistors J11 and J12 are both connected to the high-voltage input terminal VH, and the source of transistor J11 is connected to the sources of transistors MP11 and MP12. The source of transistor J12 is connected via resistor R13 to the drain of transistor MN11 and the gate of transistor MN12, and a pull-up voltage is applied to the gate of the transistor MN12. The gate of the transistor MN11 is connected to the control terminal 101c, so that an on/off signal serving as the control signal of the startup circuit 101 is input.

In such a startup circuit 101, when a high voltage is applied to the startup voltage input terminal 101a, the larger the potential difference across the source and gate of the transistor J11, the smaller is the drain current flowing from the startup device 112. In other words, the drain current decreases as the source potential of the transistor J11 increases. If the voltage drop across the transistor MP11 is neglected, then the current flowing in the transistor MP12 comprised by the current amplification circuit 113 is determined by a current which is determined by dividing the source potential of the transistor J11 by a resistance value of the resistor R11, and the current mirror ratio of the transistors MP11 and MP12.

FIG. 12 shows the voltage/current characteristics of a general junction field effect transistor. The curve $I_{JFET}$ shown in FIG. 12 shows the relation between the source-gate voltage ($V_{sg}$, [V]) and the drain current ($I_{dr}$, [A]) of a junction field effect transistor.

As shown in FIG. 12, the larger the source-gate potential difference $V_{sg}$ of the transistor J11, shown along the horizontal axis, the more there is an exponential decrease in the drain current $I_{dr}$, plotted along the vertical axis. Hence immediately after startup of the switching power supply device, the voltage at the power supply terminal VCC is near 0 V, so that the potential difference between gate and source of the transistor J11 is small, and a large current flows.

The straight line $I_{CM}$ shown in FIG. 12 is a characteristic of the current resulting from current-mirroring of the current flowing in the resistor R11 from the transistor MP11 to the transistor MP12 (as stated above, the voltage drop across the transistor MP11 is neglected). The voltage $V_{sg}$ applied across the gate and source of the transistor J11 is also the voltage applied to the resistor R11 via the transistor MP11, and if the voltage drop due to the transistor MP11 is neglected, the current flowing in the resistor R11 is proportional to the voltage $V_{sg}$. That is, the current flowing in the transistor MP12 determined by the current mirror operation has the characteristic represented by the straight line $I_{CM}$. Because the current flowing in the transistor J11 and the current flowing in the PMOS transistor MP12 are equal (however, because the mirror ratio is large, the current flowing in resistor R11 is neglected), the point of intersection of the curve $I_{JFET}$ and the straight line $I_{CM}$ is the stable point which is sought.

This stable point is determined by the voltage/current characteristic across source and gate of the transistor J11, the resistor R11, and the threshold value (Vth) of the transistor MP11; the source voltage of the transistor J11 is a constant-voltage value $V_{const}$, unrelated to the voltage value of the power supply terminal VCC or the voltage value of the high-voltage input terminal VH. When a high voltage is applied to the startup voltage input terminal 101a shown in FIG. 11, if the resistor R11 is 3 MΩ and the source potential of the transistor J11 is $V_{const}$=30 V, then the current flowing through the resistor R11 and transistor MP11 is a constant 10 μA current. The gate dimensional ratio W/L of the transistors MP11 and MP12 is assumed to be 1:100, and the startup current flowing from the transistor J11 to the startup current output terminal 101b is a constant 1 mA current.

At the time of startup of the switching power supply IC 100, a low-voltage malfunction prevention circuit such as the power supply voltage detection circuit 103 shown in FIG. 10 causes an L (low) state off signal to be input to the transistor MN11, turning off the transistor MN11. At this time, a high voltage is input to the gate terminal of the transistor MN12, so that the transistor MN12 is in the on state, and the startup circuit 101 operates so as to pass the drain current $I_{dr}$ of the transistor J11, and consequently a startup current begins to flow from the high-voltage input terminal VH toward the power supply terminal VCC.

When the voltage at the power supply terminal VCC rises to the above-described prescribed value (the higher value), an H (high) state on signal is output from the power supply voltage detection circuit 103, and the transistor MN11 comprised by the switch circuit 114 is turned on. Then, the gate potential of the transistor MN12 goes to the L state, the transistor MN12 enters the off state, and the supply of the startup current from the startup circuit 101 shown in FIG. 11 to the power supply terminal VCC stops.

FIG. 13 shows changes in the startup current in a startup circuit of the prior art. The horizontal axis in the figure shows the power supply voltage (Vcc, [V]) at the power supply terminal VCC, and the vertical axis indicates the startup current ($I_{stup}$, [mA]) from the startup current output terminal 101b of the startup circuit 101.

Here, if the source potential at the above-described stable point is $V_{const}$=18 V, then when the power supply voltage Vcc exceeds this 18 V, the source potential cannot be maintained at the 18 V of the stable point, but instead rises, so that the startup current $I_{stup}$ declines corresponding to the curve $I_{JFET}$ in FIG. 12. When the power supply voltage Vcc rises to the above-described prescribed value (higher value), the transistor MN12 enters the off state, and the startup current $I_{stup}$ becomes zero. If the resistor R11 does not have a temperature dependence (if the resistance value does not change with temperature), then as shown in the figure, a constant-current characteristic is maintained for the current value $I_{stup}$ at the power supply terminal VCC at least until the voltage at the power supply terminal VCC reaches 18 V. However, because this constant-current value has a temperature characteristic to some extent, the capacitor C2 connected externally to the power supply terminal VCC of the switching power supply control IC 100 is charged at a constant current determined by the temperature.

Japanese Patent Application Laid-open No. 2006-204082 describes an invention of a semiconductor device for switching power supply control in which, at the time of startup, the startup current passed from the startup device to the power supply terminal is made constant by a constant startup current circuit. Here, a capacitor connected externally to the power supply terminal is charged by a constant current, so that heat generation when the power supply terminal voltage is low is suppressed, and faults when the power supply terminal is shorted to ground are prevented; in addition, the power supply design is simplified.

In U.S. Pat. No. 6,940,320, and in Japanese 2007-509493 corresponding to U.S. Patent Application No. 2005/077551 A1, a power supply control system startup method is described in which two constant-current sources, large and small, are prepared for currents to be passed to the startup circuit; initially a small initial current value is used to raise the output to an initial voltage value, and when this has risen to a certain extent, the current source is switched to the large constant-current source to raise the voltage value up to the operating voltage value.

In the above-described switching power supply devices, at the time the power supply is input the startup circuit 101 receives a high voltage from the high-voltage input terminal VH, and generates a current sequence to charge the capacitor C102 for voltage stabilization. In this case, even if the power supply terminal VCC is shorted to ground, a configuration has been necessary to ensure that to the extent possible a large current does not flow, in order that the switching power supply control IC 100 does not generate heat nor is not destroyed due to combustion.

The technology of the prior art disclosed in Japanese Patent Application Laid-open No. 2006-204082 prevents faults when the power supply terminal VCC is shorted to ground by executing control such that the startup current is a constant magnitude during startup; but because a configuration is employed which passes a charging current with a constant value regardless of the voltage at the power supply terminal VCC, if the constant current value is too small, a long time is required until power supply startup. If the current value of the startup current is set to a large value in order to shorten the startup time, then there is the problem that heat generation and combustion cannot reliably be prevented when an anomaly occurs.

In the technology of the prior art described U.S. Pat. No. 6,940,320 and U.S. Patent Application No. 2005/0077551 A1, a configuration is employed in which the fact that the potential at the power supply terminal VCC has risen to an initial voltage value is detected, and switching is then performed to a circuit to supply a large startup current. For this reason, there is the advantage that when the power supply terminal VCC is shorted to ground, a large current does not flow.

However, a fault in a switching power supply device is not necessarily a fault in which the power supply terminal VCC is completely shorted to ground, and because Zener circuit elements are comprised, it is conceivable that after the voltage has risen to a certain extent a large current flows in the control circuit, and as a result a heat generation or combustion fault occurs. Hence in the technology of the prior art, there has been the problem that heat generation and combustion of the switching power supply control IC cannot be reliably prevented.

SUMMARY OF THE INVENTION

The invention provides a semiconductor device for switching power supply control which limits the startup current supplied from the high-voltage input terminal, and reliably prevents heat generation and combustion in the event of an anomaly.

Further the invention provides a startup circuit which outputs a startup current with a magnitude corresponding to the voltage value of the power supply terminal, and a startup method for a switching power supply device.

The invention preferably includes a semiconductor device for switching power supply control of a switching power supply device, which has a DC power supply, transformer, switching element connected to the DC power supply to control a current flowing in a primary-side main winding of the transformer, and capacitor for voltage stabilization connected to an auxiliary winding of the transformer, and which supplies power to a load connected to a secondary-side winding of the transformer. The semiconductor device for switching power supply control comprises a high-voltage input terminal for startup, connected to the DC power supply; a power supply terminal, connected to the capacitor for voltage stabilization, which outputs a startup current to charge the capacitor for voltage stabilization after power supply input to the switching power supply device; and a startup circuit, connected between the high-voltage input terminal and the power supply terminal, which charges the capacitor while controlling the startup current at a magnitude corresponding to the voltage value of the power supply terminal, and which turns off the startup current after startup of the switching power supply device and supplies the power supply voltage from the transformer auxiliary winding to the power supply terminal.

The high-voltage input terminal for startup is connected to the DC power supply. The power supply terminal is connected to the capacitor for voltage stabilization, and after power supply input to the switching power supply device, a startup current is output to charge the capacitor for voltage stabilization. The startup circuit is connected between the high-voltage input terminal and the power supply terminal, and charges the capacitor while controlling the magnitude of the startup current corresponding to the voltage value of the power supply terminal, and moreover turns off the startup current after startup of the switching power supply device, and supplies the power supply voltage from the transformer auxiliary winding to the power supply terminal.

Further, the invention preferably provides a startup circuit, having a DC power supply, transformer, switching element connected to the DC power supply which controls the current flowing in the primary-side main winding of the transformer, and capacitor for voltage stabilization connected to auxiliary winding of the transformer, to start up a switching power supply device and which supplies power to a load connected to a secondary-side winding of the transformer. This startup circuit comprises a high-voltage input terminal for startup, connected to the DC power supply; a power supply terminal, connected to the capacitor for voltage stabilization, which outputs a startup current to charge the capacitor for voltage stabilization after power supply input to the switching power supply device; a startup device, connected to the high-voltage input terminal, which passes the startup current; a voltage conversion circuit, which generates a variable voltage signal with magnitude corresponding to the voltage signal of the power supply terminal; and, a current amplification circuit, provided between the startup device and the power supply terminal, which generates a variable current signal serving as the startup current based on the variable voltage signal.

Further, the invention preferably provides a startup method to start up a switching power supply device, having a DC power supply, transformer, switching element connected to the DC power supply which controls the current flowing in the primary-side main winding of the transformer, and capacitor for voltage stabilization connected to an auxiliary winding of the transformer, and which supplies power to a load connected to a secondary-side winding of the transformer, by means of a startup circuit connected to the DC power supply. This startup method comprises a step, at the time of power supply input to the switching power supply device, of supplying a startup voltage from the high-voltage input terminal of the startup circuit; a step, after power supply input to the switching power supply device, of charging the capacitor for voltage stabilization, while controlling the startup current from the startup current output terminal of the startup circuit so as to proportional to, or a linear function of, the voltage value of the capacitor for voltage stabilization; and, a step, after startup of the switching power supply device, of turning off the startup current, and supplying the power supply voltage from an auxiliary winding of the transformer to the power supply terminal of the startup circuit.

By means of a startup circuit, or a startup method, of the invention, the capacitor can be charged by passing current from the startup circuit with magnitude corresponding to the voltage value of the power supply terminal.

By means of a semiconductor device for switching power supply control of the invention, when the power supply terminal is shorted to ground, almost no startup current flows, so that heat generation and combustion in the event of an anomaly can be reliably prevented. Further, in the startup circuit, control is executed such that the startup current increases accompanying the rise in the power supply voltage, so that short-circuits comprising Zener circuit elements can also be addressed, and the time required until the capacitor charging is completed and the switching power supply device is started up can be shortened.

Further advantages, features, modifications and embodiments of the invention will become apparent to those skilled in the art from the following detailed description of the preferred embodiments of the invention and the accompanying drawings.

BRIEF DESCRIPTION OF THE DRAWINGS

The invention will be described with reference to certain preferred embodiments thereof and the accompanying drawings, wherein.

DETAILED DESCRIPTION OF THE PREFERRED EMBODIMENTS

Figure 1:
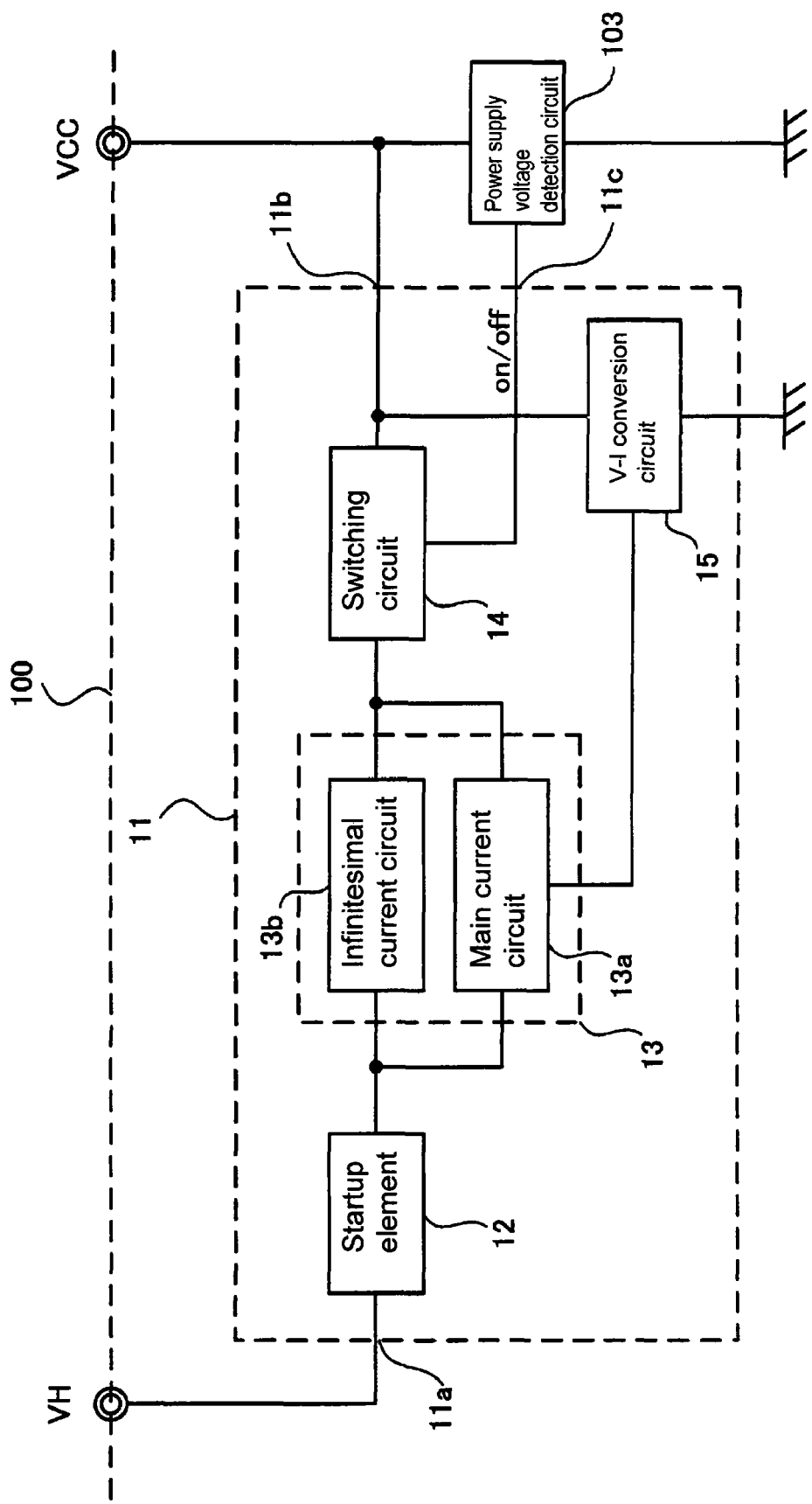
FIG. 1 is a block diagram showing the configuration of the startup circuit in accordance with a first embodiment of the invention.
Figure 9:
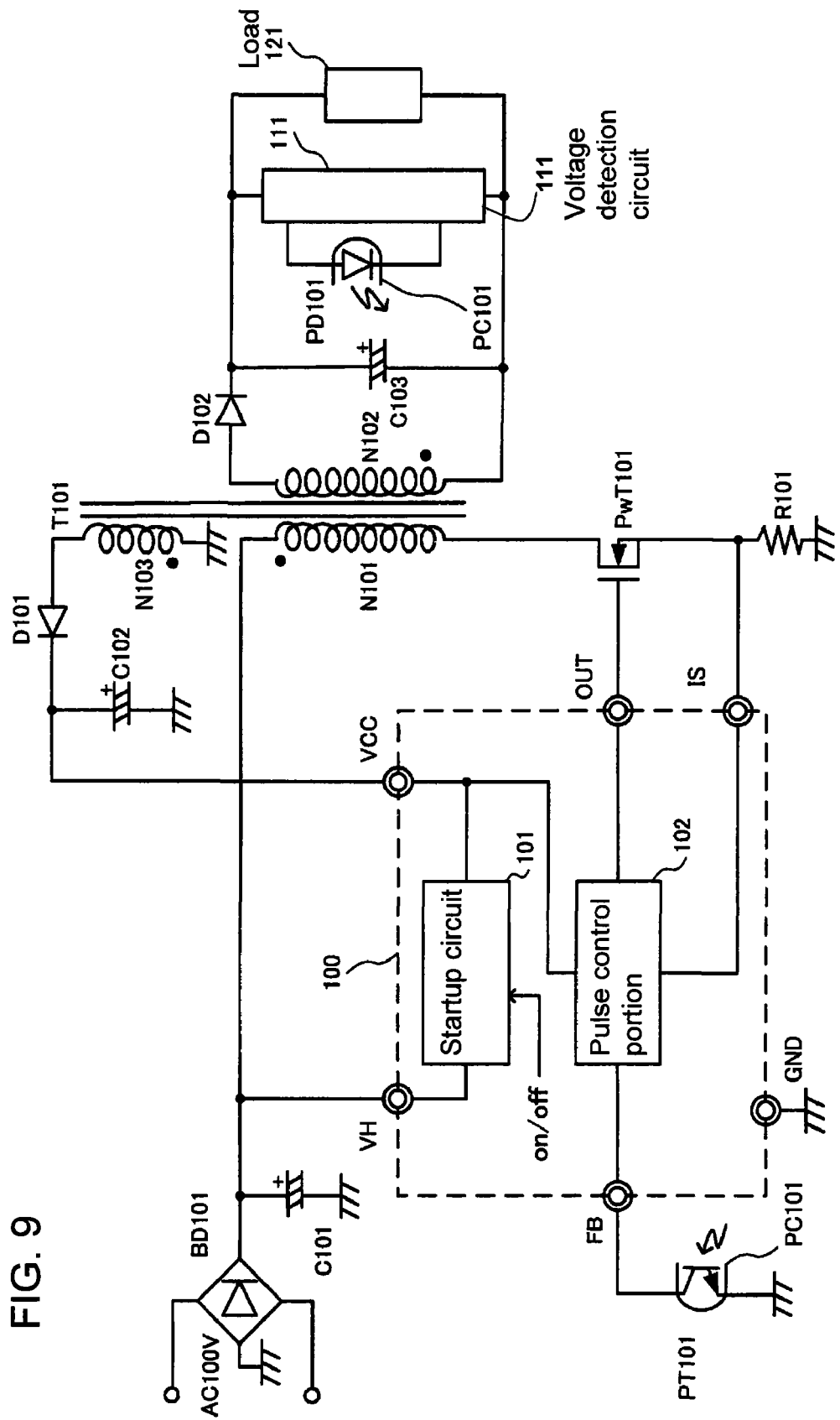
FIG. 9 is a block diagram showing an example of a switching power supply device.

FIG. 1 is a block diagram showing the configuration of the startup circuit in accordance with a first embodiment of the invention. The startup circuit 11 comprises a startup device 12, current amplification circuit 13 comprising a main current circuit 13a and infinitesimal current circuit 13b, switch circuit 14, and voltage-current conversion circuit (V-I conversion circuit) 15, and has a startup voltage input terminal 11a, startup current output terminal 11b, and control terminal 11c. The startup voltage input terminal 11a of the startup circuit 11 is connected to the high-voltage input terminal VH of the switching power supply control IC 100 (see FIG. 9 described above). The startup current output terminal 11b is connected to the power supply terminal VCC of the IC 100, and the control terminal 11c is connected to the power supply voltage detection circuit 103.

A capacitor C102 for voltage stabilization is connected externally to the startup current output terminal 11b of the startup circuit 11, via the power supply terminal VCC of the IC 100. A high voltage supplied to the primary side of the transformer T101 via the high-voltage input terminal VH is input to the startup voltage input terminal 11a. The startup device 12 is a high-breakdown voltage element to which most of the high potential difference between the high-voltage input terminal VH and the power supply terminal VCC is applied, and has the function of protecting other elements from high voltages. The current amplification circuit 13 decides the startup current, using a current mirror which amplifies a current serving as reference, and outputs the startup current from the startup current output terminal 11b via the switch circuit 14 to charge the capacitor C102. The power supply voltage detection circuit 103 detects the voltage at the power supply terminal VCC, and outputs on/off signals, serving as control signals for the startup circuit 11, to the switch circuit 14.

Figure 10:
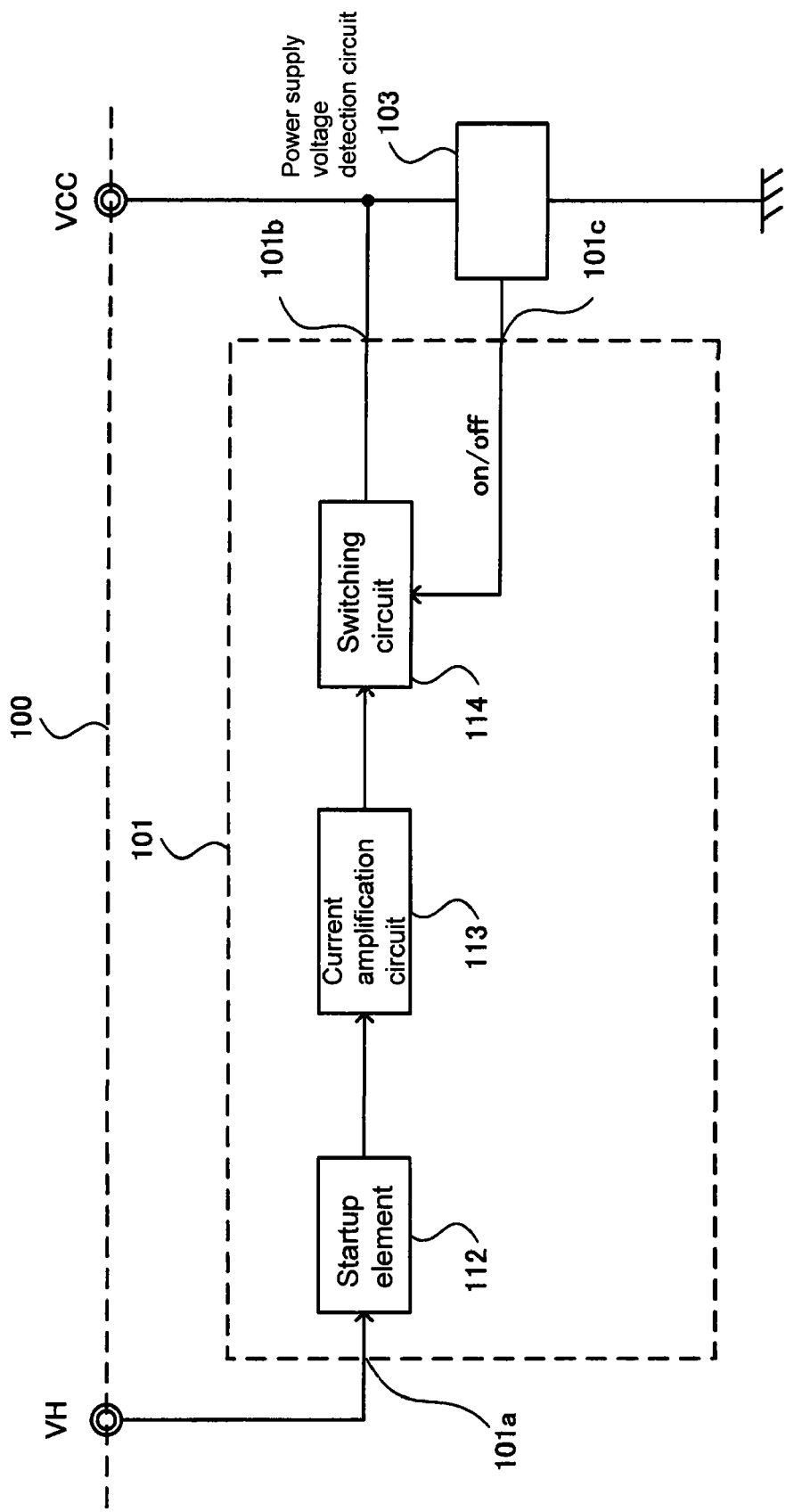
FIG. 10 is a block diagram showing the configuration of a startup circuit of the prior art.

Here, in the first place a difference with a startup circuit 101 of the prior art (FIG. 10) is the new provision of a voltage-current conversion circuit 15, and the generation of a first variable current signal of magnitude corresponding to the voltage signal at the power supply terminal VCC. A second difference is that the current amplification circuit 13 comprises a main current circuit 13a and an infinitesimal current circuit 13b; an infinitesimal current is passed through the power supply terminal VCC by the infinitesimal current circuit 13b immediately after power supply input, and when the voltage at the power supply terminal VCC has begun to rise, which has been amplified to a magnitude which is a linear function thereof, is output from the main current circuit 13a.

Figure 2:
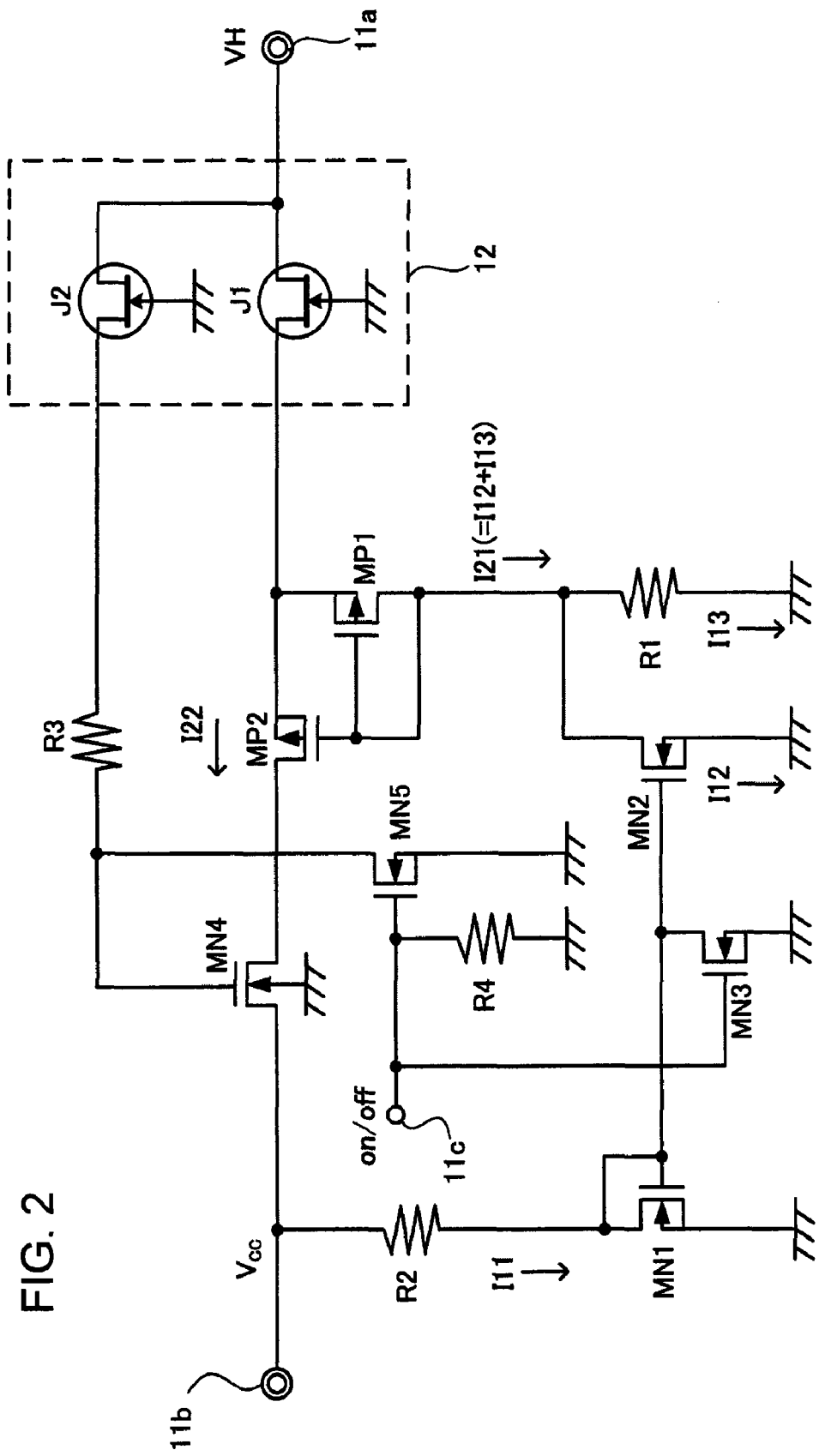
FIG. 2 is a circuit diagram showing an example of the specific configuration of the startup circuit of the first embodiment.

Next, a specific example of a startup circuit 11 is explained. FIG. 2 is a circuit diagram showing an example of the specific configuration of the startup circuit of the first embodiment of the invention. In the startup circuit 11, a startup device 12 comprises N-channel high-breakdown voltage junction field effect transistors J1 and J2 (hereafter simply called transistors J1 and J2). The gates of the transistors J1 and J2 are both connected to ground, and the drains are connected in common to the startup voltage input terminal 11a, to which a high-voltage input VH is supplied. The source of the transistor J1 is grounded via a series circuit comprising a first P-channel MOS transistor MP1 (hereafter simply called transistor MP1) and a first resistor R1. The transistor J1 receives the high voltage VH at the drain terminal from the startup voltage input terminal 11a as a result of power supply input to the switching power supply device, and passes a charging current from the source terminal to the startup current output terminal 11b.

First and second N-channel MOS transistors MN1 and MN2 (hereafter simply called transistors MN1 and MN2) and a second resistor R2 form the voltage-current conversion circuit 15, and a first variable current signal (hereafter called current I11) is generated with a magnitude corresponding to the voltage signal of the startup current output terminal 11b. One end of the second resistor R2 is connected to the startup current output terminal 11b, and the other end is connected to the drain of the transistor MN1. The drain and gate of the transistor MN1 are connected together, and the source is grounded. The source of the transistor MN2 is grounded, and the gate is connected to the gate of the transistor MN1, so as to pass a current I12 which mirrors the current I11 flowing in the transistor MN1.

The gates of the transistors MN1 and MN2 forming the current mirror circuit are connected to the drain of an N-channel MOS transistor MN3 (hereafter simply called transistor MN3) comprised by the switch circuit 14. The source of this transistor MN3 is grounded, and the gate is connected to the control terminal 11c. On/off signals serving as control signals of the startup circuit 11 are input to this control terminal 11c.

The gates of the transistor MP1 and a second P-channel MOS transistor MP2 (hereafter simply called transistor MP2) are connected together to form a current mirror circuit, and the current amplification circuit 13 of FIG. 1 is formed by these transistors MP1 and MP2 and the resistor R1. The transistor MP2 is provided in the current path between the startup device 12 and the startup current output element 11b. Based on the current mirror current I12 flowing in the transistor MN2, a second variable current signal (hereafter called the charging current I22) which serves as a charging current is generated by the transistor MP2 in the current path to the startup current output terminal 11b. A further N-channel MOS transistor MN4 (hereafter called switching transistor MN4) is positioned between this transistor MP2 and the startup current output terminal 11b, and the gate of this switching transistor MN4 is connected, via a resistor R3, to the source terminal of the transistor J2.

The source of the transistor MP1 is connected to the source terminal of the transistor J1, and the base and drain are grounded via the resistor R1. The drain of the transistor MN2 is connected to the connection point of the transistor MP1 and the first resistor R1.

The connection point of the resistor R3 and switching transistor MN4 is connected to ground via an N-channel MOS transistor MN5 (hereafter simply called transistor MN5) comprised by the switch circuit 14. The gate of this transistor MN5 is pulled down to ground by the resistor R4, and is connected to the control terminal 11c. The switching transistor MN4 is a switching transistor in the circuit path connecting the source terminal of the transistor J1 and the startup current output terminal 11b; the gate voltage is pulled up by the source voltage of the transistor J2 and the resistor R3.

First, when an L-state off signal is input to the transistors MN3 and MN5, a current mirror current I12 corresponding to the current I11 flows, and a current I21, which is the sum of the current mirror current I12 and the initial current I13 flowing in the resistor R1, flows in the transistor MP1. The transistors MP1 and MP2 are connected in a current mirror configuration, so that a current mirror current resulting from amplification of the current I21 flowing in the transistor MP1 flows in the current path as the charging current I22.

Comparing FIG. 2 with FIG. 1, the transistors MP1 and MP2 and the resistor R3 are equivalent to the infinitesimal current circuit 13b, and the transistors MP1 and MP2 and the transistor MN2 are equivalent to the main current circuit 13a.

Figure 3:
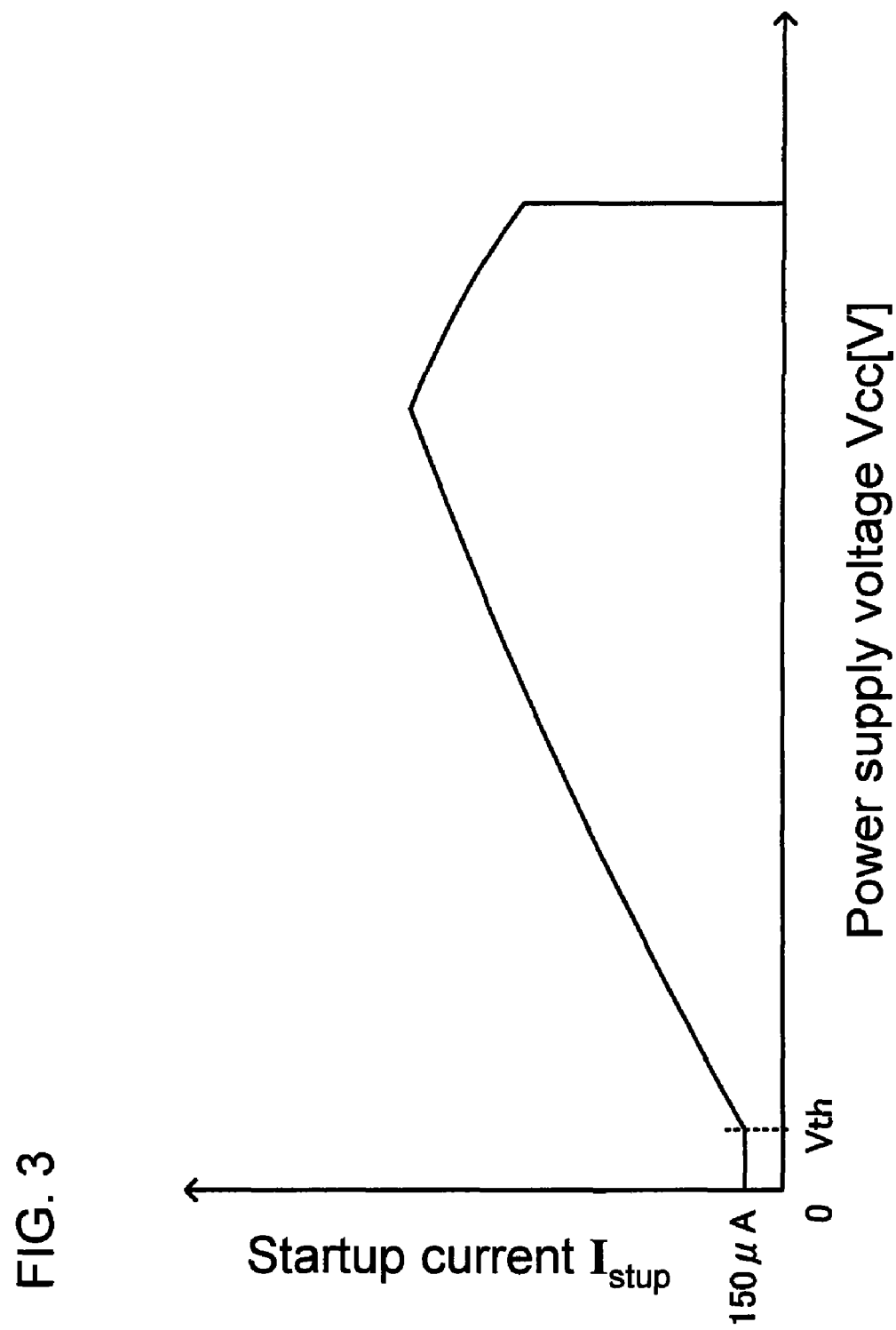
FIG. 3 shows the voltage dependence of the startup current flowing in the startup circuit of the first embodiment.

FIG. 3 shows the voltage dependence of the startup current flowing in the startup circuit of the first embodiment of the invention. Here, the horizontal axis plots the power supply voltage (Vcc), and the vertical axis plots the startup current ($I_{stup}$). The high voltage VH supplied to the main winding of the transformer upon input of a power supply to the switching power supply device is supplied to the high-voltage input terminal 11a for startup. In the startup device 12, the source voltage of the transistor J1 is generated, and an initial current I13 flows in the resistor R1. If the resistance value of the resistor R1 is 10 MΩ, and a 30 V source voltage is generated at the transistor J1, then an initial current I13 of magnitude 3 µA flows.

At this time, the power supply voltage Vcc of the startup current output terminal 11b is 0 V, so that currents I11, I12 do not flow in the current mirror circuit comprising the transistors MN1 and MN2. However, in the current amplification circuit 13 comprising the current mirror circuit of the transistors MP1 and MP2, the initial current I13 flowing in the resistor R1 is amplified corresponding to the mirror ratio, and begins to flow to the startup current output terminal 11b.

If a gate dimensional ratio W/L of the transistors MP1 and MP2 of 1:50 is assumed when calculating the startup current $I_{stup}$, then a current of 150 µA flows to the startup current output terminal 11b. When the power supply voltage Vcc rises due to the charging current, the current I11 flowing in the second resistor R2 is expressed by the following equation.

$$I11 = (Vcc - Vth)/R_2 \quad (1)$$

Here Vth is the threshold voltage of the transistor MN1, and $R_2$ is the resistance value of the second resistor R2. In this way, the power supply voltage Vcc gradually begins to rise from 0 V, and at the same time the current I11 flowing in the transistor MN1 increases. Hence the change occurring in the charging current I22 is an increase in proportion to the magnitude of the power supply voltage Vcc, as shown in FIG. 3.

If the gate dimensional ratio W/L of the transistors MN1 and MN2 is 1:10, then the current mirror current I12 is expressed by the following equation.

$$I12 = 10 \times (Vcc - Vth)/R_2 \quad (2)$$

Hence the charging current I22 is expressed by the following equation.

$$I22=50\times\{10\times[(Vcc-Vth)/R_2]+3\} \quad (3)$$

That is, after the input of the power supply to the switching power supply device, the capacitor is charged by the charging current I22 from the startup current output terminal 11b of the startup circuit 11, and by increasing the charging current I22 at a magnitude proportional to the voltage value Vcc, the capacitor is charged.

Figure 12:
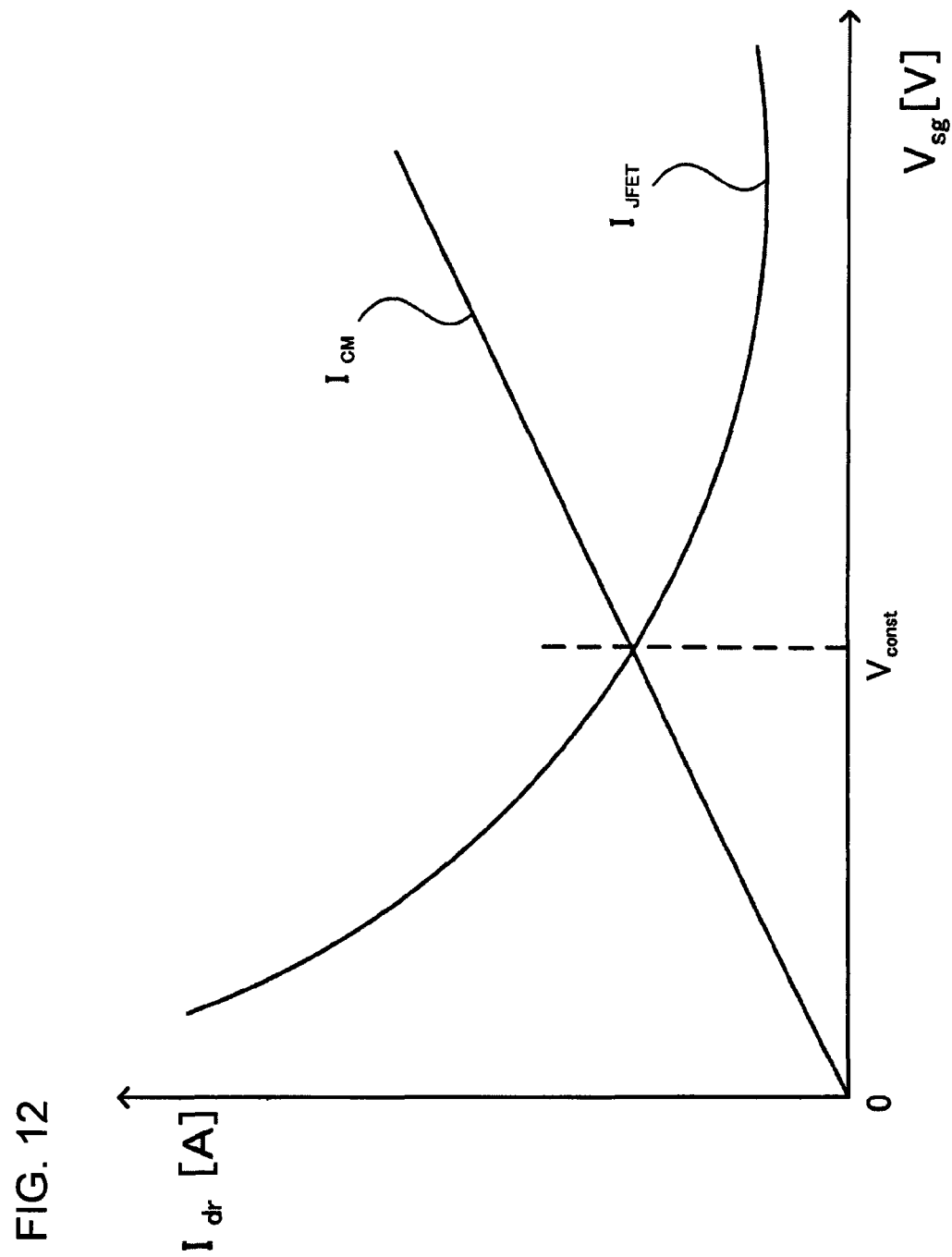
FIG. 12 shows the voltage/current characteristics of a general junction field effect transistor; and, FIG. 13 shows changes in the startup current in a startup circuit of the prior art.
Figure 13:
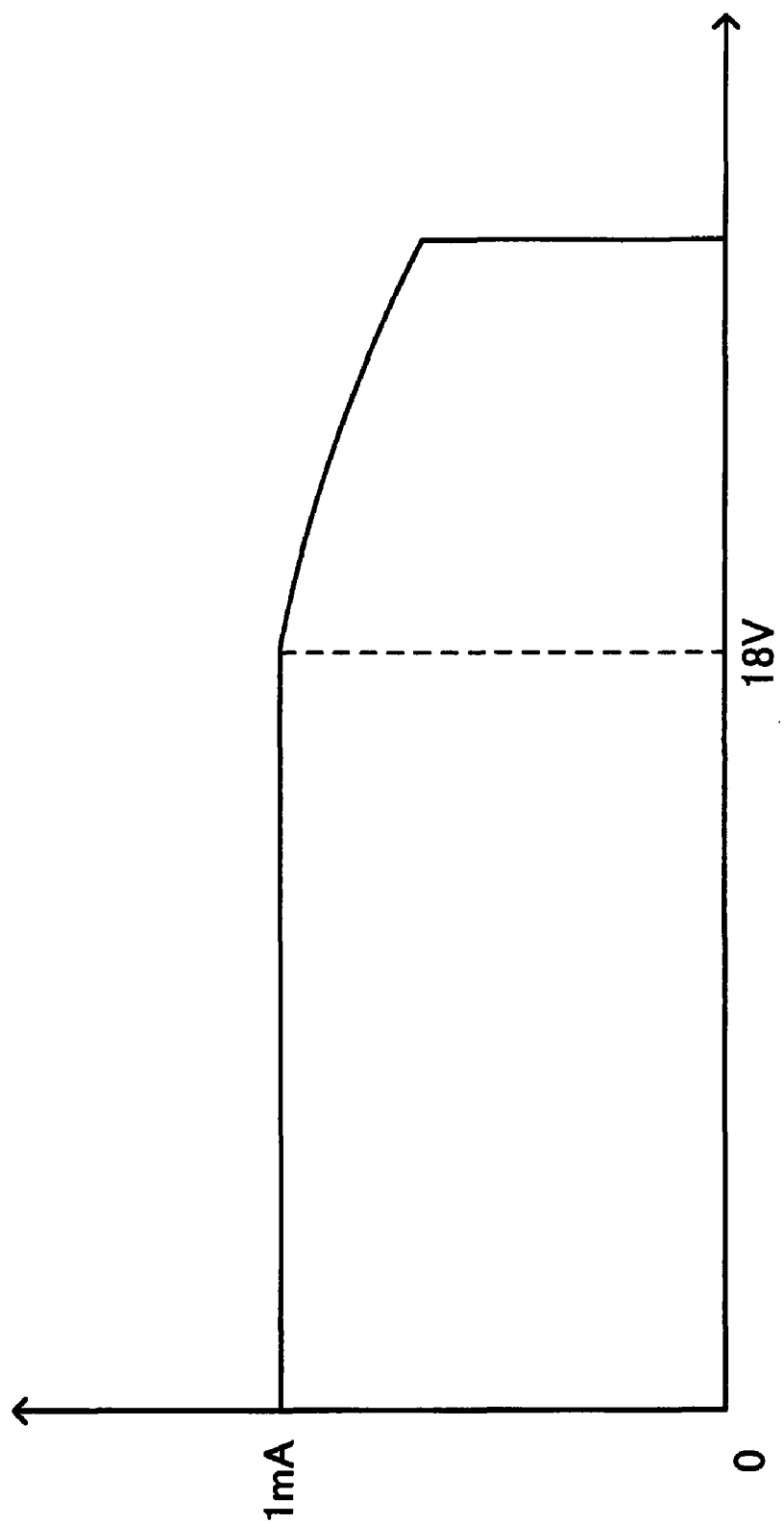

In FIG. 3, the change of the startup current ($I_{stup}$) from rising to falling is the same phenomenon as when the power supply voltage Vcc exceeds the source potential $V_{const}$=18 V corresponding to the stable point in FIG. 13 above. That is, the source potential of the transistor J1 cannot be maintained at the stable point, and rises, so that the startup current $I_{stup}$ declines according to the curve $I_{JFET}$ in FIG. 12. When the power supply voltage Vcc rises to a prescribed value at which operation of the switching power supply device is possible, an H-state on signal is input to the transistors MN3 and MN5, which are turned on. By this means, the current mirror current I12 flowing in the transistor MN2 goes to zero, and at the same time the switching transistor MN4 in the current path in which the charging current I22 had been flowing is turned off, so that the charging current no longer flows. Also, around the time the charging current is shut off, operation of the switching power supply device begins. By this means, in the switching power supply control IC 100, the startup current from the startup circuit 11 is turned off, and a power supply voltage is supplied only from the coil N103 of the transformer T101.

In this way, the startup circuit 11 in the first embodiment is connected between the high-voltage input terminal VH and the power supply terminal VCC, and increases the charging current I22 at a magnitude proportional to the voltage value Vcc of the power supply terminal VCC while charging the capacitor C102, and in addition, after startup of the switching power supply device, turns off the charging current I22 and supplies the power supply voltage Vcc from the coil N103 of the transformer T101, so that in a case in which the power supply terminal VCC is shorted to ground, almost no charging current I22 flows from the startup current output terminal 11b. And, control is executed such that the charging current I22 increases accompanying the rise of the power supply voltage Vcc, so that a large current does not suddenly flow when the voltage has risen by a certain amount. Hence heat generation and combustion at the switching power supply control IC can be reliably prevented in the event of an anomaly.

Further, as indicated in equation (3) above, the charging current I22 depends on the power supply voltage Vcc, and so is not readily affected by the voltage/current characteristics of the transistors J1 and J2. Hence even when variation occurs among characteristics in processes to manufacture the switching power supply control IC 100, and when there are fluctuations in temperature in the environment of use, there are no longer concerns about variation in the time until startup of the switching power supply device.

Figure 11:
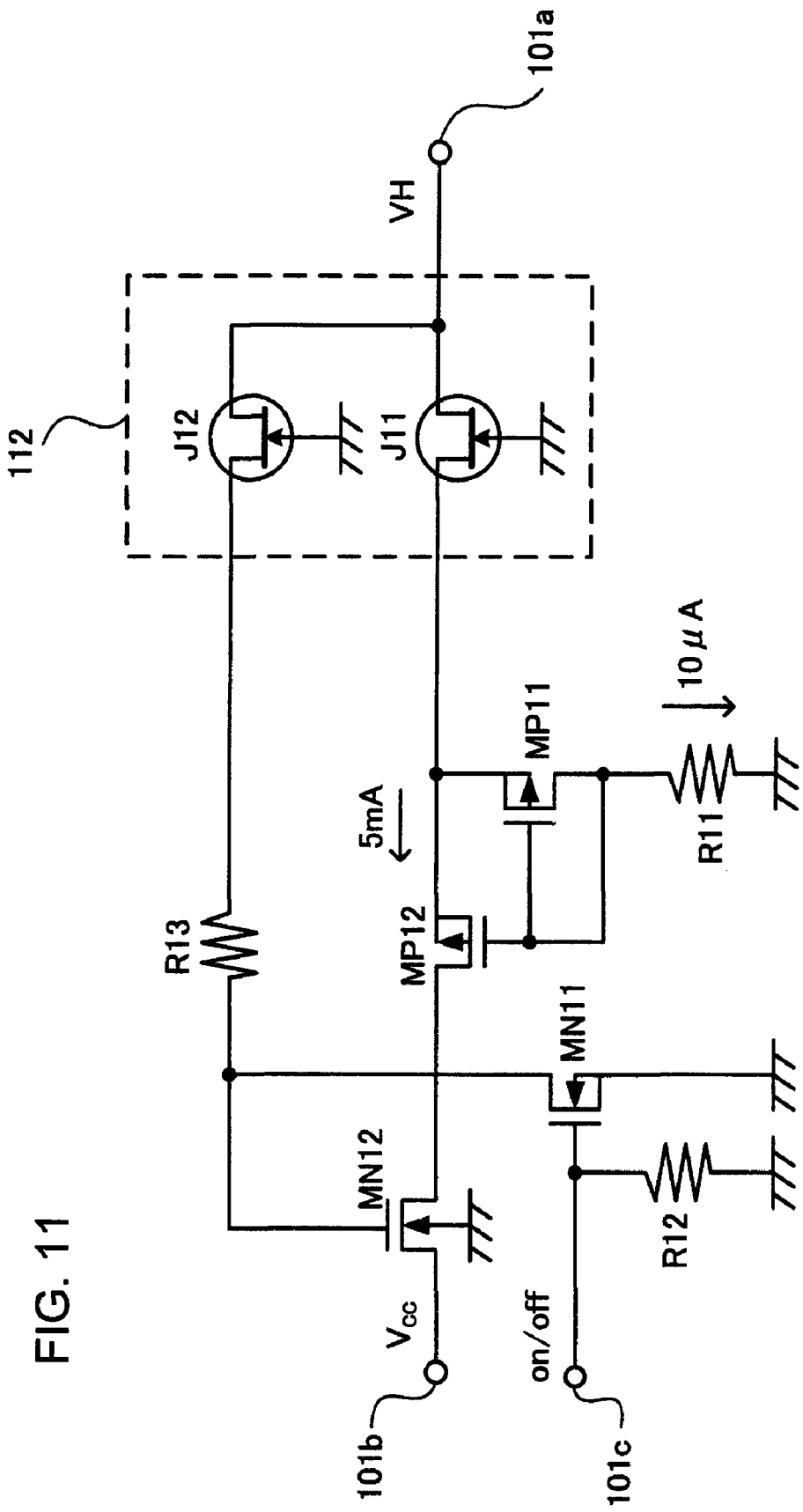
FIG. 11 is a circuit diagram showing an example of the specific configuration of a startup circuit of the prior art.

When the startup circuit 11 is halted, the current flowing from the high-voltage input terminal VH is only the infinitesimal current flowing in the first resistor R1 of the startup circuit 11, so that the current consumption during standby can be reduced. In a circuit of the prior art (FIG. 11), the current value flowing in the resistor R1 during standby is 10 µA, but even when the initial current is amplified by the same 500-fold, the current value during standby is reduced to 3 µA.

Further, in the current amplification circuit 13 and voltage-current conversion circuit 15, current amplification is performed by passing two independent current mirror currents, so that compared with a configuration of the prior art in which 500-fold current amplification is performed in a single-stage mirror circuit, the total area occupied by the transistors MP1, MP2, MN1, MN2 used for amplification can be reduced to approximately one-tenth the area.

Figure 4:
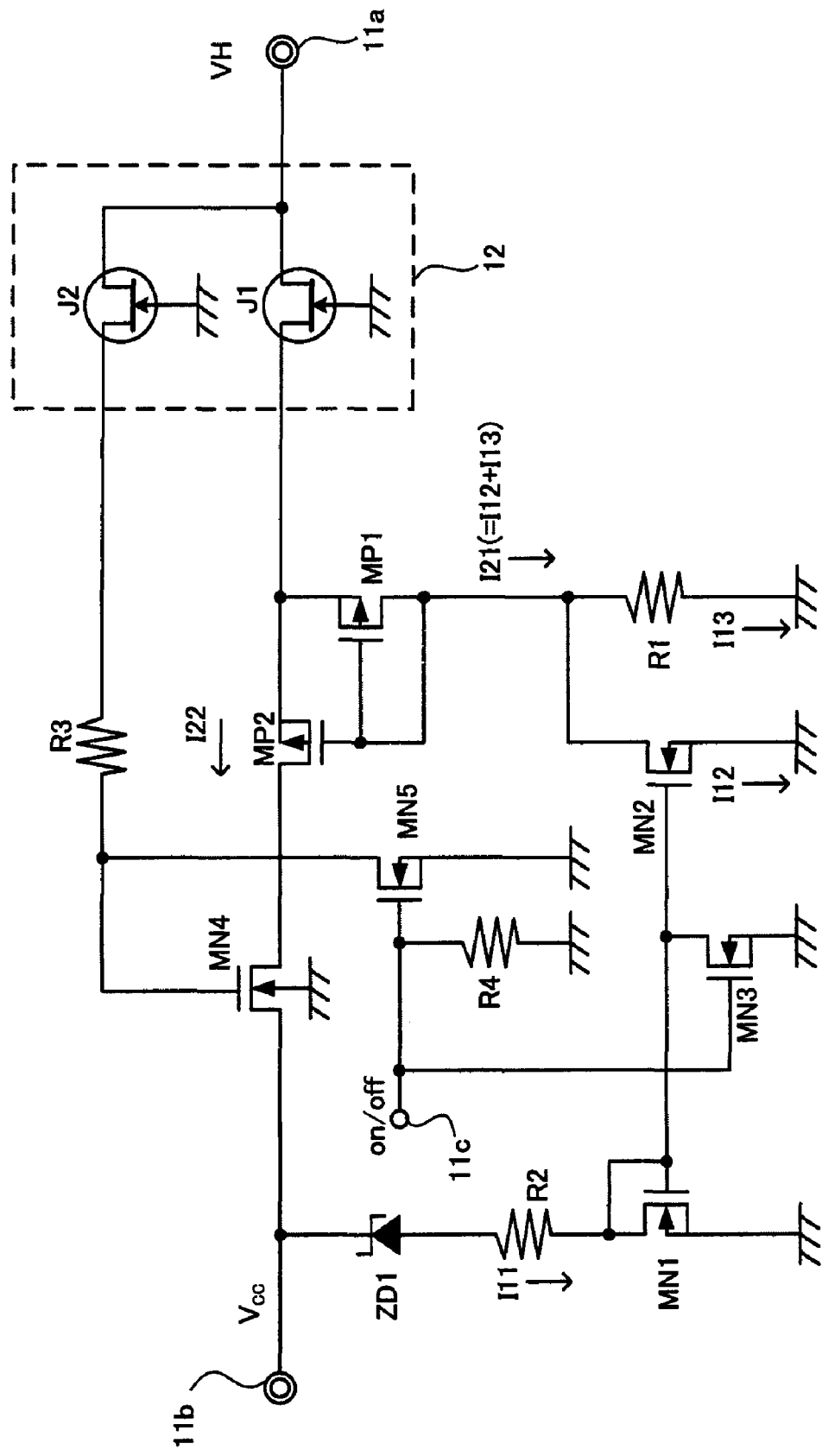
FIG. 4 is a block diagram showing the configuration of the startup circuit in accordance with a second embodiment of the invention.

FIG. 4 is a block diagram showing the configuration of the startup circuit in accordance with a second embodiment of the invention. Here, portions corresponding to the startup circuit of the first embodiment are assigned the same symbols, and in the following explanations of such portions are omitted.

Figure 5:
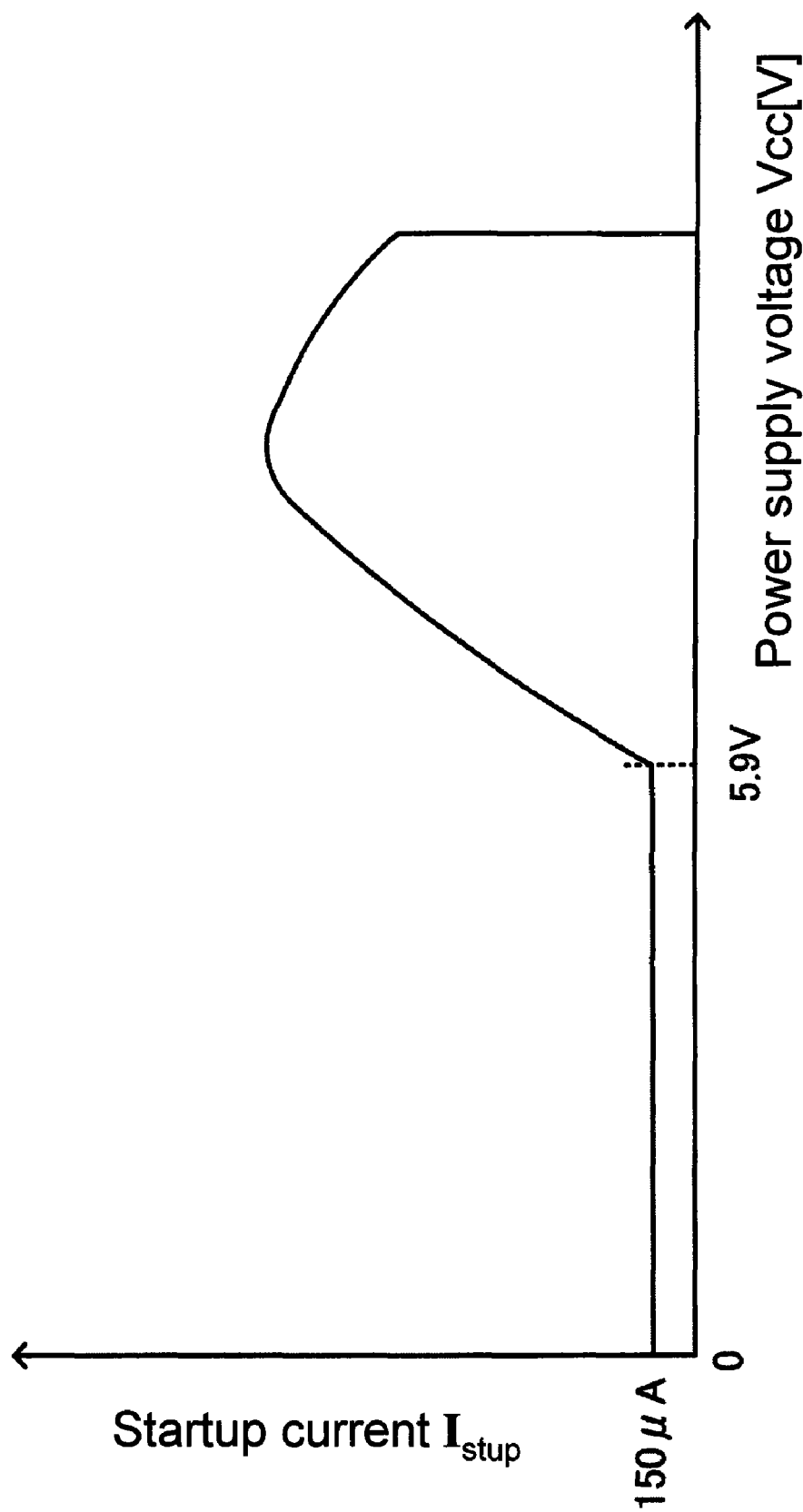
FIG. 5 shows the voltage dependence of the startup current flowing in the startup circuit of the second embodiment.

FIG. 5 shows the voltage dependence of the startup current flowing in the startup circuit of the second embodiment. Here the horizontal axis plots the power supply voltage (Vcc), and the vertical axis plots the startup current ($I_{stup}$). Compared with the startup circuit of FIG. 2, the startup circuit shown in FIG. 4 is different in that the resistance circuit portion comprised by the second resistor R2 is replaced with a series circuit of a Zener diode ZD1 and a resistor R2. That is, the voltage-current conversion circuit 15 comprising the transistors MN1 and MN2, Zener diode ZD1, and resistor R2 is configured so as not to operate until the charging current I22, based on the initial current I13 flowing in the resistor R1, flows to the capacitor C102 connected to the startup current output terminal 11b, and the voltage signal at the startup current output terminal 11b rises to a certain magnitude.

In FIG. 4, the current I11 flowing in the series circuit of the Zener diode ZD1 and resistor R2 is expressed by the following equation.

$$I11=(Vcc-Vz-Vth)/R_2 \quad (4)$$

Here, Vth is the threshold voltage of the transistor MN1, $R_2$ is the resistance value of the second resistor R2, and Vz is the Zener voltage of the Zener diode ZD1. Hence if the Zener voltage Vz is for example 4.9 V, and the threshold voltage is for example 1 V, then until the power supply voltage Vcc reaches 5.9 V, the charging current I22 is passed at a constant magnitude based on the initial current I13, such as for example 150 µA. And, once the power supply voltage Vcc reaches 5.9 V, the charging current begins to rise gradually. The startup current $I_{stup}$ at this time increases in proportion to the magnitude of the power supply voltage Vcc, as shown in FIG. 5.

If the gate dimensional ratio W/L of the transistors MN1 and MN2 is 1:10, then the current mirror current I12 is expressed as follows.

$$I12=10\times(Vcc-Vz-Vth)/R_2 \quad (5)$$

Hence the charging current I22 is expressed as follows.

$$I22=50\times\{10\times[(Vcc-Vz-Vth)/R_2]+3\} \quad (6)$$

In this way, the startup circuit 11 of Aspect 2 is connected between the high-voltage input terminal VH and the power supply terminal VCC, and supplies an infinitesimal current until a startup current flows to the capacitor C102 and the power supply voltage Vcc rises to a certain value; upon exceeding a prescribed voltage, the charging current I22 is increased in proportion to the voltage value Vcc of the power supply terminal VCC while continuing to charge the capacitor C102. Hence even when a Zener circuit element is present between the power supply terminal VCC and ground and a short occurs, only an infinitesimal charging current I22 based on the initial current I13 flows, so that there are no concerns about a large current such as might cause heat generation or combustion. Hence heat generation and combustion at the switching power supply control IC in the event of an anomaly can be more reliably prevented.

Figure 6:
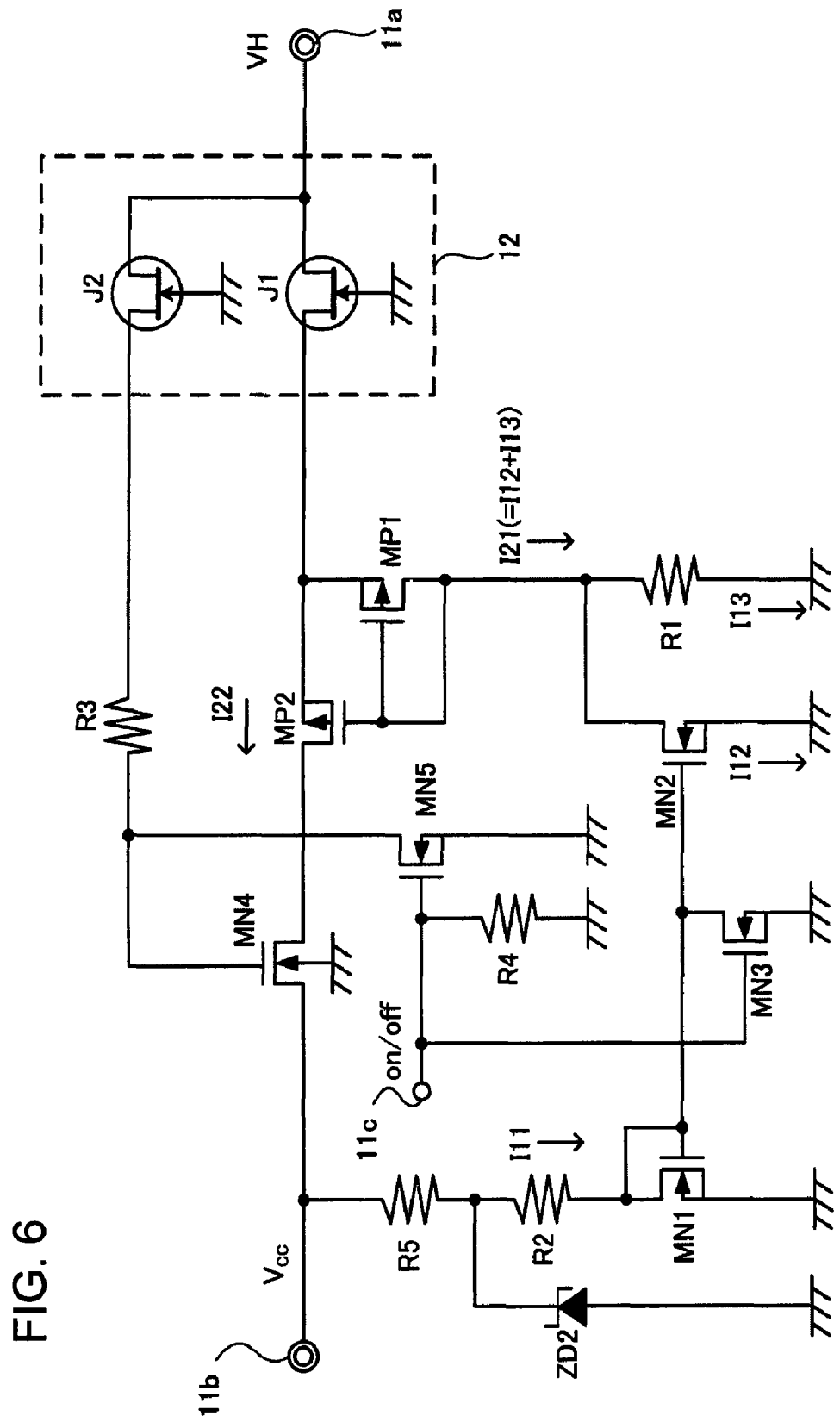
FIG. 6 is a block diagram showing the configuration of the startup circuit in accordance with a third embodiment of the invention.
Figure 7:
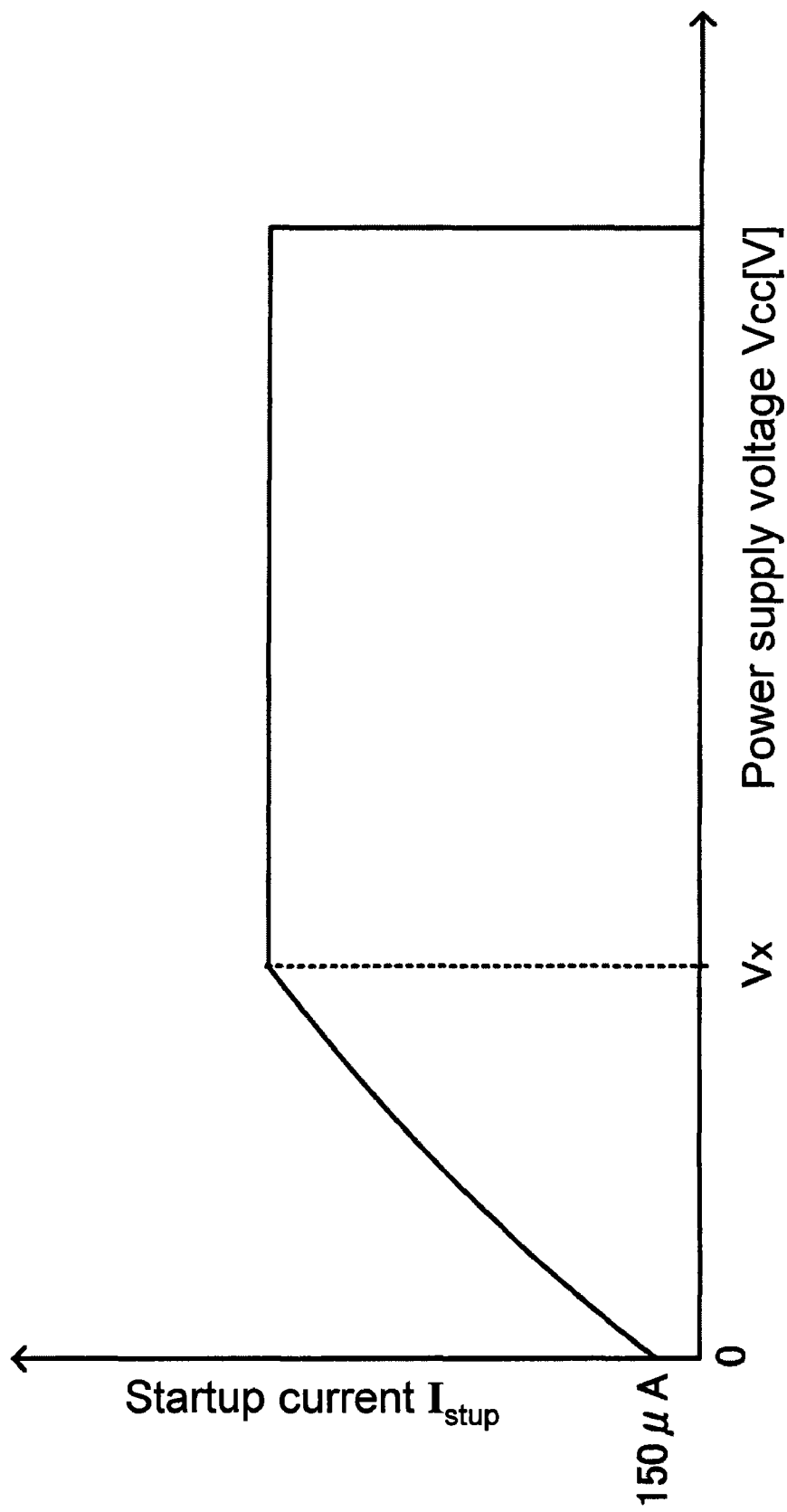
FIG. 7 shows the voltage dependence of the startup current flowing in the startup circuit of the third embodiment.

FIG. 6 is a block diagram showing the configuration of the startup circuit in accordance with a third embodiment of the invention. FIG. 7 shows the voltage dependence of the startup current flowing in the startup circuit of the third embodiment of the invention. Here, portions which corresponding to portions of the startup circuit of the first embodiment are assigned the same symbols, and in the following explanations of such portions are omitted.

Compared with the startup circuit of FIG. 2), the startup circuit shown in FIG. 6 differs in that the resistance circuit portion comprising the second resistor R2 is replaced with a series circuit comprising a third resistor R2 and fourth resistor R5 and with a second Zener diode ZD2, the cathode of which is connected to the connection point of these resistors R2 and R5, and the anode of which is grounded. That is, the voltage-current conversion circuit 15 comprising the transistors MN1 and MN2, Zener diode ZD2, and resistors R2 and R5 is configured such that after the power supply voltage Vcc rises to a constant voltage determined by the Zener voltage Vz of the Zener diode ZD2 and the resistance values of the resistors R2 and R5, the charging current is held at a constant value, as shown in FIG. 7.

In FIG. 6, when the power supply voltage Vcc rises to a certain potential Vx due to the charging current I22, the current I11 flowing in the series circuit of the resistors R5 and R2 is expressed by the following equation. Here $R_5$ is the resistance value of the fourth resistor R5, and $R_2$ is the resistance value of the third resistor R2.

$$I11=(Vcc-Vth)/(R_5+R_2) \quad (7)$$

Hence the current value of the charging current I22, similarly to that explained in first embodiment, increases in proportion to the magnitude of the power supply voltage Vcc. If the resistance values of the resistors R5 and R2 are respectively 100 kΩ and 400 kΩ, then as shown in FIG. 7, the magnitude of the charging current I22 is fixed after the power supply voltage Vcc reaches the voltage Vx given by the following equation.

$$Vx=(Vz-Vth)\times\{(100+400)/400\}+Vth \quad (8)$$

For example, if the Zener voltage Vz is 4.9 V and the threshold voltage Vth is 1 V, then calculation gives 5.875 V for Vx.

Figure 8:
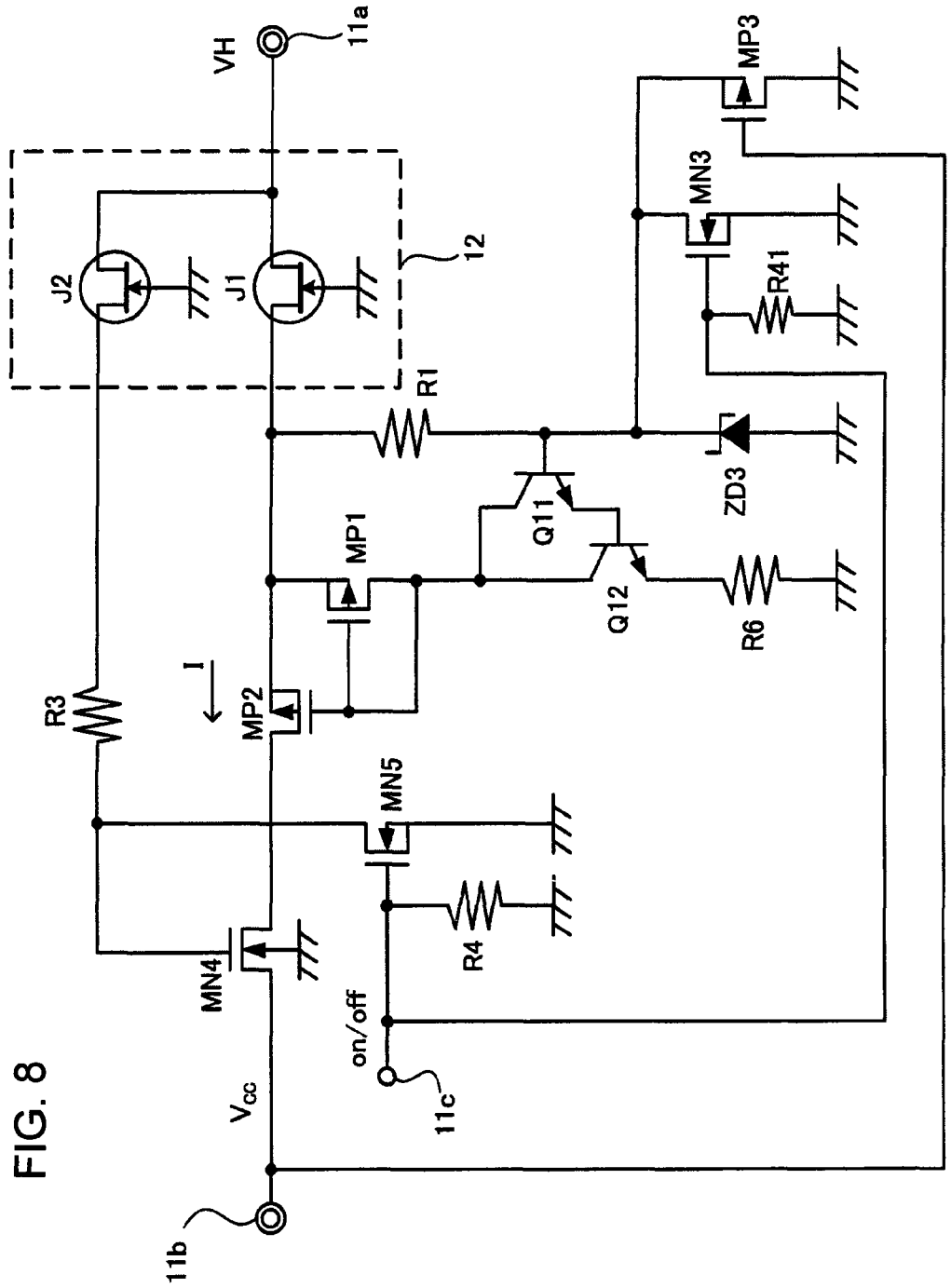
FIG. 8 is a block diagram showing the configuration of the startup circuit of a fourth embodiment of the invention.

FIG. 8 is a block diagram showing the configuration of the startup circuit in accordance with a fourth embodiment of the invention. This startup circuit replaces the transistors MN1 and MN2 in the startup circuit of FIG. 2 with an emitter-follower circuit comprising two Darlington-connected NPN transistors Q11 and Q12, to form a voltage-current conversion circuit 15. Here, the collectors of the transistors Q11 and Q12 are connected to the drain of the transistor MP1, the emitter of the transistor Q11 is connected to the base of the transistor Q12, and the emitter of the transistor Q12 is grounded via the resistor R6.

Further, the source terminal of the transistor J1 is grounded via the series circuit comprising the resistor R1 and Zener diode ZD3, and the base of the transistor Q11 is connected to the connection point of the resistor R1 and Zener diode ZD3. The base of the transistor Q11 is connected to ground via the P-channel MOS transistor MP3 (hereafter simply called transistor MP3) and the transistor MN3. The gate of the transistor MP3 is connected to the startup current output terminal 11b, and the transistor MP3 functions as a source-follower with respect to the potential at the output terminal 11b. The gate of the transistor MN3 is connected to one end of the resistor R41, the other end of which is grounded, and to the control terminal 11c. The on/off signal serving as the control signal of the startup circuit 11 is input to this control terminal 11c.

If the power supply voltage Vcc at the startup current output terminal 11b is 0 V, then the source potential of the transistor MP3 is the threshold voltage Vth of the transistors MP3 (approximately 2.5 V), and the voltage resulting by subtracting the base-emitter voltage of transistors Q11 and Q12 (1.4 V) from this source potential, or approximately 1.1 V, is applied to the resistor R6. Hence the current flowing in this resistor R6 is amplified by the current mirror ratio of the two transistors MP1 and MP2 comprised by the current amplification circuit 13, to result in the charging current I. The charging current I is supplied, via the startup current output terminal 11b, to the capacitor C102 connected to the power supply terminal VCC, and the power supply voltage Vcc rises. When the power supply voltage Vcc rises, the voltage (Vcc+2.5V−1.4V=Vcc+1.1V) is applied to the resistor R by the source-follower of transistor MP3 and the emitter-follower circuit of transistors Q11 and Q12. By this means, the charging circuit I increases in proportion to, or as a linear function of, the voltage value (Vcc) of the capacitor C102 for voltage stabilization, connected to the power supply terminal VCC.

In this way, similarly to the first embodiment, the rising voltage at the power supply terminal VCC is accompanied by a rise in the source potential of the transistor MP3, so that the voltage across resistor R6 rises, and the charging current I increases. However, the source potential of the transistor MP3 is clamped at the Zener voltage Vz (approximately 7 V) by the Zener diode ZD3 provided in parallel, so that the maximum value of the charging current I is determined by this clamping voltage.

In this startup circuit, the charging current supplied to the startup current output terminal 11b can be determined independently of the characteristics of the transistor J1 which is the startup device (in Aspect 1 to Aspect 3, the current flowing in the resistor R1 is determined in conjunction with the characteristics of the transistor J1), and so there is the advantage that operation is not affected by variations in the characteristics of the startup device occurring in processes to manufacture the switching power supply control IC 100, or by changes in the temperature of the usage environment or similar.

Further, the source-follower circuit comprising the transistor MP3 may be replaced with an emitter-follower circuit using bipolar transistors, and the emitter-follower circuit comprising transistors Q11 and Q12 may be replaced with a source-follower circuit using MOS transistors.

The invention further includes a startup method which performs positive-feedback control of the magnitude of the startup current by means of the voltage value of the power supply terminal VCC, and is not limited only to the above-described aspects. Preferably, a startup method for a switching power supply device for starting up a switching power supply device, which has a DC power supply, transformer, switching element connected to the DC power supply to control a current flowing in a primary-side main winding of the transformer, and capacitor for voltage stabilization connected to an auxiliary winding of the transformer, and which supplies power to a load connected to a secondary-side winding of the transformer, by means of a startup circuit connected to the DC power supply, in accordance with in the invention includes: supplying a startup voltage from a high-voltage input terminal of the startup circuit at the time of power supply input to the switching power supply device; charging, after power supply input to the switching power supply device, the capacitor for voltage stabilization, while controlling the startup current from the startup current output terminal of the startup circuit so as to proportional to, or a linear function of, a voltage value of the capacitor for voltage stabilization; and turning off the startup current, and supplying the power supply voltage from the auxiliary winding of the transformer to the power supply terminal of the startup circuit after startup of the switching power supply device.

The invention has been described with reference to certain preferred embodiments thereof, it will be understood, however, that modifications and variations are possible within the scope of the appended claims.

This application is based on, and claims priority to, Japanese Patent Application No: 2008-071098, filed on Mar. 19, 2008. The disclosure of the priority application, in its entirety, including the drawings, claims, and the specification thereof, is incorporated herein by reference.

What is claimed is:

1. A semiconductor device for switching power supply control in a switching power supply device which has a DC power supply, a transformer, a switching element connected to the DC power supply to control a current flowing in a primary-side main winding of the transformer, and a capacitor for voltage stabilization connected to an auxiliary winding of the transformer, and which supplies power to a load connected to a secondary-side winding of the transformer, comprising:
   a high-voltage input terminal for startup, connected to the DC power supply;
   a power supply terminal, which is connected to the capacitor for voltage stabilization, and which outputs a startup current to charge the capacitor for voltage stabilization after power supply input to the switching power supply device; and
   a startup circuit, which is connected between the high-voltage input terminal and the power supply terminal, and which charges the capacitor while controlling the startup current at a magnitude corresponding to a voltage value of the power supply terminal, and turns off the startup current after startup of the switching power supply device and supplies a power supply voltage from the transformer auxiliary winding to the power supply terminal wherein the startup circuit has a startup device connected to the high-voltage input terminal, a voltage-current conversion circuit which generates a first variable current signal of magnitude corresponding to a voltage signal at the power supply terminal, and a current amplification circuit, provided between the startup device and the power supply terminal, for generating a second variable current signal serving as the startup current, based on the first variable current signal.

2. The semiconductor device for switching power supply control according to claim 1, wherein
   the startup device includes a first junction field effect transistor, a drain of which is connected to the high-voltage input terminal, and which passes the startup current supplied to the power supply terminal, and a second junction field effect transistor, a drain of which is connected to the high-voltage input terminal, and
   a source of the second junction field effect transistor is connected to a gate of a switching transistor interposed in the current path connecting a source of the first junction field effect transistor and the power supply terminal, and supplies a pull-up voltage to the gate.

3. The semiconductor device for switching power supply control according to claim 2, wherein the current amplification circuit includes a series circuit of a first P-channel MOS transistor and a first resistor, series-connected between the source of the first junction field effect transistor and ground, and a second P-channel MOS transistor, which is provided in the current path, and the gate of which is connected with the gate of the first P-channel MOS transistor, and which passes a current mirror current.

4. The semiconductor device for switching power supply control according to claim 1, wherein the voltage-current conversion circuit includes:
   a first N-channel MOS transistor, the drain and gate of which are connected, and the source of which is grounded;
   a second N-channel MOS transistor, which passes a current mirror current for the current flowing in the first N-channel MOS transistor; and
   a resistance circuit, one end of which is connected to the power supply terminal, and the other end of which is connected to the drain of the first N-channel MOS transistor.

5. The semiconductor device for switching power supply control according to claim 4, wherein the resistance circuit includes a second resistor and a first Zener diode, which are series-connected.

6. The semiconductor device for switching power supply control according to claim 4, wherein the resistance circuit includes a series-connected circuit comprising a third resistor and a fourth resistor, and a second Zener diode, the cathode of which is connected to connection points of the third and fourth resistors, and the anode of which is grounded.

7. The semiconductor device for switching power supply control according to claim 1, wherein the voltage-current conversion circuit includes an emitter-follower circuit comprising a plurality of Darlington-connected transistors.

8. A startup circuit starting up a switching power supply device, which has a DC power supply, transformer, switching element connected to the DC power supply to control a current flowing in a primary-side main winding of the transformer, and capacitor for voltage stabilization connected to an auxiliary winding of the transformer, and which supplies power to a load connected to a secondary-side winding of the transformer, wherein the startup circuit comprises:
   a high-voltage input terminal for startup, connected to the DC power supply;
   a power supply terminal, which is connected to the capacitor for voltage stabilization, and which outputs a startup current to charge the capacitor for voltage stabilization after power supply input to the switching power supply device;
   a startup device, connected to the high-voltage input terminal, for passing the startup current;
   a voltage conversion circuit, which generates a variable voltage signal of magnitude corresponding to a voltage signal of the power supply terminal; and
   a current amplification circuit, which is provided between the startup device and the power supply terminal, and which generates a variable current signal serving as the startup current based on the variable voltage signal.

9. The startup circuit according to claim 8, wherein a source-follower circuit or an emitter-follower circuit, connected to the power supply terminal, is used to generate the variable voltage signal, and another separate source-follower circuit or another emitter-follower circuit, to which the variable voltage signal is input, is used to generate the variable current signal.

10. A startup method for a switching power supply device for starting up a switching power supply device, which has a DC power supply, transformer, switching element connected to the DC power supply to control a current flowing in a primary-side main winding of the transformer, and capacitor for voltage stabilization connected to an auxiliary winding of the transformer, and which supplies power to a load connected to a secondary-side winding of the transformer, by means of a startup circuit connected to the DC power supply, the method comprising:

supplying a startup voltage from a high-voltage input terminal of the startup circuit at the time of power supply input to the switching power supply device;

charging, after power supply input to the switching power supply device, the capacitor for voltage stabilization, while controlling the startup current from the startup current output terminal of the startup circuit so as to proportional to, or a linear function of, a voltage value of the capacitor for voltage stabilization; and turning off the startup current, and supplying the power supply voltage from the auxiliary winding of the transformer to the power supply terminal of the startup circuit after startup of the switching power supply device wherein the startup circuit has a startup device connected to the high-voltage input terminal, a voltage-current conversion circuit which generates a first variable current signal of magnitude corresponding to a voltage signal at the power supply terminal, and a current amplification circuit, provided between the startup device and the power supply terminal, for generating a second variable current signal serving as the startup current, based on the first variable current signal.

* * * * *